United States Patent
Laurent et al.

(10) Patent No.: US 11,007,735 B2
(45) Date of Patent: May 18, 2021

(54) TIRE MOLD

(71) Applicant: The Goodyear Tire & Rubber Company, Akron, OH (US)

(72) Inventors: David Charles Jacques Robert Laurent, Tilff (BE); Thomas Minisini, Aywaille (BE); Babak Rabbanipour Esfahani, Schieren (LU); Gauthier Freddy E C V C Piret, Stavelot (BE); Béni Rukundo, Arlon (BE); Guilherme Pacheco, Diekirch (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 16/927,227

(22) Filed: Jul. 13, 2020

(65) Prior Publication Data

US 2021/0039344 A1 Feb. 11, 2021

Related U.S. Application Data

(60) Provisional application No. 62/884,332, filed on Aug. 8, 2019.

(51) Int. Cl.
*B29D 30/06* (2006.01)
*B29C 33/10* (2006.01)

(52) U.S. Cl.
CPC .......... *B29D 30/0605* (2013.01); *B29C 33/10* (2013.01); *B29D 30/0606* (2013.01); *B29D 30/0629* (2013.01); *B29D 2030/0617* (2013.01)

(58) Field of Classification Search
CPC ............ B29D 30/0606; B29D 30/0629; B29D 2030/0617; B29C 33/10
See application file for complete search history.

(56) References Cited

U.S. PATENT DOCUMENTS

| 4,895,502 A | 1/1990 | Beard et al. |
| 5,431,873 A | 7/1995 | Vandenberghe |

(Continued)

FOREIGN PATENT DOCUMENTS

| DE | 102014216865 A1 | | 2/2016 |
| DE | 10 2014 216 962 | * | 3/2016 |

(Continued)

OTHER PUBLICATIONS

Extended European Search Report dated Jan. 19, 2021 for European Patent Application No. 20189364.1, the European counterpart to the subject patent application.

*Primary Examiner* — James P Mackey
(74) *Attorney, Agent, or Firm* — Alvin T. Rockhill

(57) ABSTRACT

An advanced tire mold has been developed which offers the advantages of reducing the level of whiskers on the surface of the tire, reduces sticking to the mold, and which facilitates enhanced gas removal. This tire mold includes a mold segment having an inner side for contacting the uncured tire, an outer side opposite to the inner side, and a plurality of vent passages which allow gas to pass from the inner side of the mold segment to the outer side of the mold segment, the vent passages comprising vent slots, wherein each vent slots have an inlet at the inner side of the mold segment, and wherein the vent slots taper from the inlets to the outer side of the mold segment. This tire mold can be comprised of multiple mold segments which can be utilized in a tire curing press.

20 Claims, 2 Drawing Sheets

(56) References Cited

U.S. PATENT DOCUMENTS

| | | | |
|---|---|---|---|
| 5,449,483 | A | 9/1995 | Greenwood et al. |
| 6,290,810 | B1 | 9/2001 | Yovichin et al. |
| 6,367,765 | B1 * | 4/2002 | Wieder ................ B22C 9/067 249/141 |
| 6,382,943 | B1 | 5/2002 | Metz et al. |
| 6,402,489 | B1 | 6/2002 | Dyer |
| 6,808,376 | B2 | 10/2004 | Serener-Thielmann |
| 6,871,831 | B1 | 3/2005 | Cuny et al. |
| 7,125,511 | B2 | 10/2006 | Serener-Thielmann |
| 7,524,175 | B2 | 4/2009 | Henrotte et al. |
| 7,811,078 | B2 | 10/2010 | Serener-Thielmann et al. |
| 7,896,643 | B2 | 3/2011 | Serener-Thielmann |
| 8,221,106 | B2 | 7/2012 | Serener-Thielmann |
| 8,656,981 | B2 * | 2/2014 | Enokido ................ B22C 9/28 164/15 |
| 2004/0208945 | A1 | 10/2004 | Ciesa et al. |

FOREIGN PATENT DOCUMENTS

| | | |
|---|---|---|
| EP | 0591745 A2 | 4/1994 |
| EP | 2554349 B1 | 2/2013 |
| EP | 3321077 A1 | 5/2018 |
| EP | 3321078 A1 | 5/2018 |
| EP | 3403802 A1 | 11/2018 |

\* cited by examiner

TIRE MOLD

This application claims benefit of U.S. Provisional Patent Application Ser. No. 62/884,332, filed on Aug. 8, 2019. The teachings of U.S. Provisional Patent Application Ser. No. 62/884,332 are incorporated herein by reference in their entirety.

FIELD OF THE INVENTION

The present invention is directed to a tire mold segment, a tire mold including tire mold segments, and a curing press including a tire mold with tire mold segments.

BACKGROUND

The majority of pneumatic tires are molded in curing presses in which non-vulcanized tires (green tires) are pressed by bladders against a mold to provide the tire with its final shape. During this step of the manufacturing process gases need to be removed from the tire and its surface in order to avoid bubbles and other unwanted irregularities caused by gas inclusions. It is known in the art to use circular vent openings in the tire mold in order to allow gases to escape out of the tire mold. During this venting process, rubber also flows into the vent openings which results in cylindrical protrusions on the outer surface of the cured tire. These protrusions on the fully manufactured tire are sometimes referred to as "whiskers" and are frequently removed for the sake of improved optical appearance and/or for uniform shape and properties. Such a removal is frequently done manually or requires further automated manufacturing steps, thereby resulting in increased costs. During conventional molding procedures rubber sometimes gets stuck in the vent holes of the mold and needs to be manually removed which again results in the additional cost associated with the cleaning procedure. Even worse, clogged vent holes can prevent entrapped gas from properly being vented from the mold which can result in the uncured rubber not properly filling the mold which ultimately result in tire uniformity issues. Additionally, entrapped gas situated between the uncured tire and the mold can adversely affect heat transfer which can result in the tire not being cured uniformly and again can cause problems with the uniformity of the tire. Even though tire venting technology has improved over the decades there still remains a long felt need for further improvements in tire mold and vent technology.

SUMMARY OF THE INVENTION

A first object of the invention may be to provide an advanced tire mold which leaves only a relatively small amount rubber "whiskers" on the outer surface of the finished tire as a result of uncured rubber escaping from the mold through vent openings.

Another object of the invention may be to provide an advanced mold which allows a relatively easy extraction of residual rubber out of the venting openings (vent openings) of the mold, and which reduces the quantity of residual rubber stuck in the mold.

Yet another object of the invention may be to support an enhanced level of gas removal from the mold by allowing for better paths for gas to escape through the vents and a reduced tendency for such vents to become clogged with residual rubber causing an obstruction to the path for the gas to escape from the mold.

Thus, in a first aspect of the invention, a tire mold segment for contacting and/or molding an uncured tire is provided, the mold segment comprising an inner side for contacting the uncured tire, an outer side opposite to the inner side, and a plurality of vent passages for conducting gas from the inner side (or surface) of the mold segment to the outer side (or surface) of the mold segment. The venting passages comprise vent slots (or grooves), wherein each venting slot has an inlet (or opening) at the inner side of the mold segment, wherein the inlet has a width which is within the range of 10 µm to 100 µm and wherein the venting slots taper from the inlets in a direction to the outer side (or back side) of the mold segment.

Providing venting passages with venting slots may help to increase the probability that gas finds an exit out of the mold. Moreover, the tapering shape helps to avoid that too much rubber enters the venting slots and/or channels, which results in less rubber that can potentially be left on the surface of the cured tire. In addition, the tapering shape and/or the slot shape may support also the extractability of rubber out of the venting holes (vent holes). Finally, the relatively small size of the inlets in combination with the tapering shape avoids also the intrusion of large amounts of rubber into the venting slots such that the potential amount of rubber remaining on the tire as a result of the venting slots is small. This may even result in the effect that in many applications the remaining rubber protrusions caused by the venting slots do not have to be removed anymore, thereby resulting in improved cost efficiency.

In one embodiment of this invention, the venting slots have a length which is within the range of 2 mm to 50 mm, optionally from 3 mm to 40 mm, measured in parallel to the inner side, or, in other words, inner surface of the mold. Thus, the length of the slots is considerably larger than the width of the venting slots. This may result in an improved venting capability while keeping the width dimension relatively small.

In another embodiment, the inlet (which may also be understood as an opening on the inner surface of the mold) has a width which is within the range of 15 µm to 70 µm, preferably from 25 µm to 50 µm. It has been found by the inventors that such ranges constitute an interesting compromise between the ability of letting gas escape through the mold and reducing the amount of rubber entering the venting slots.

In yet another embodiment, the venting slots have outlets essentially opposite to the inlets, wherein the outlets have a width of at least 5 µm. Such ranges may allow that a significant amount of gas may escape from the mold. Preferably, the width of the outlet is at least 10 µm smaller than the width of the inlet.

In still another embodiment, the venting slots have a depth which in within the range of 0.8 mm to 5 mm, optionally from 1 mm to 3 mm. Thus, the preferred depth of the venting slots is relatively small compared to some prior art examples. In particular, larger depths may be less desirable in order to avoid rupture of rubber received in the slots or too long remaining rubber protrusions on the tire after removal of the mold.

In still another embodiment, the venting passages comprise at least one channel, the channel being optionally a bore, fluidly connecting one or more outlets of one or more venting slots with the outer side of the mold. In particular, it is preferred to avoid an extension of the venting slots over a large thickness of the mold. As mold segments or molds may typically have thicknesses of 1 cm or more, said channel or channels help to transport the gas or air outside of the mold. In particular, each slot may have one channel for venting gas out of that channel. Otherwise, it would be also possible to have one or more channels contacting a plurality of slots for venting air received in the slots out of the mold.

In still another embodiment, the channel has a diameter of at least 0.8 mm, and optionally of at most 1.5 cm. Another preferred range could be from 1 mm to 5 mm. This reduces resistance to remove air out of the mold and may maintain still the stability of the mold. Moreover, such channels can be produced cost efficiently.

In yet another embodiment, the venting passages comprise at least one channel fluidly connecting one or more outlets of the venting slots with the outer side of the mold by intersecting with an end region of one or more venting slots, said end region being located opposite to the inlet and below half of the maximum depth of the respective venting slot. This combination of features allows the use of the advantageous properties of small width and tapering venting slots together with large channels that are able to transport and/or receive large quantities of gas and are efficient to manufacture.

In yet another embodiment, the venting slots are laser-cut into the mold segment. Laser-cutting is a preferred way to create the slots in accordance with the invention, while other ways may be possible such as molding, etching or other methods known in the art.

In another embodiment, the mold segment or in other words the body of the mold segment consists essentially of a metal, such as aluminum.

In yet another embodiment, multiple of the venting slots are arranged at least partially in parallel to one of: recesses in the mold for forming ribs or tread blocks in the tire; and the circumferential direction of the tire. Such an arrangement may help to achieve a better uniform optical appearance which may reduce the necessity to remove remainders of rubber entered into the mold on the tire.

In still another embodiment, the venting slots have an opening angle β of up to 10°, preferably of only up to 8°. These relatively small angles ease the contacting of venting slots with channels while reducing the amount of venting rubber remainders on the tire and in the slots and/or channels. The angle β should be of at least 0.2° or preferably at least 0.5° and more preferably at least 1°. In other words the angle β will typically be within the range of 0.2° to 10° and will preferably with within the range of 0.5° to 8°. For instance, the angle β can be within the range of 1° to 3°, 2° to 4°, 3° to 5°, 4° to 6°, 5° to 7°, or 6° to 8°.

In still another embodiment, the venting slots taper continuously from the inlet to an opposite end of the venting slots. In particular, the venting slots may taper continuously until the intersection with channels of the venting passages described also herein. Such continuous tapering shall be understood within the accuracy of manufacturing such as with laser cutting, thereby allowing a surface roughness caused by the cutting process. However, continuous tapering is not intended to include intended changes of inclination, in particular between tapering walls of a slot and parallel walls of a slot along the depth of the slot.

In still another embodiment, the edges of the mold segments are free of venting slots. In other words, edges of two or more mold segments contacting each other when the segments are mounted together to form the mold do not have such venting slots. Venting slots are rather desired to be provided on an inner side of the mold segments for contacting the uncured tire but are not supposed to be provided at lateral sides of the mold segments.

In still another embodiment, the mold segments comprise a plurality of protrusions on the inner side for contacting a crown area of the uncured tire and forming grooves therein.

In a second aspect of the present invention, a tire mold for molding (and/or curing) an uncured tire is provided, the tire mold comprising tire mold segments, wherein at least one of the mold segments comprises an inner side for contacting the uncured tire, an outer side opposite to the inner side, and a plurality of venting passages for conducting gas from the inner side of the mold segment to the outer side of the mold segment. The venting passages comprise venting slots, wherein each venting slot has an inlet at the inner side of the mold segment, with the inlet having a width from 10 μm to 100 μm and wherein the venting slots taper from the inlets in a direction to the outer side of the mold segment.

In a third aspect of the present invention, a tire mold for molding (and/or curing) an uncured tire is provided, the tire mold comprising a (radially) inner side for contacting the uncured tire, a (radially) outer side opposite to the inner side, and a plurality of venting passages for conducting gas from the inner side of the mold to the outer side of the mold, the venting passages comprising venting slots, wherein each venting slot has an inlet at the inner side of the mold, the inlet having a width from 10 μm to 100 μm and wherein the venting slots taper from the inlets in a direction to the outer side of the mold.

Advantages mentioned already above in relation to mold segments in accordance with the present invention apply also for respective tire molds.

In an embodiment, the tire mold segments are one of: essentially ring-shaped mold segments mounted axially on top of each other; and ring segments connected to one another in a circumferential direction. In other words, in one embodiment the mold segments may be ring elements having a radially inner side and a radially outer side and axially lower and upper sides, wherein two ring segments may be fit on top of each other by joining and/or connecting the upper side of one ring element with the lower side of the other ring element. The mold may have more than two of such ring elements. In another embodiment, a set of mold segments comprises mold segments that are joinable and/or connectable in a circumferential direction to form the (circumferential) mold. In other words, each mold segment has lateral sides that may be joined so that connecting all mold segments serially in a ring shape forms the mold. Mold segments as well as their mounting are as such known in the art of tire manufacturing.

In another embodiment the tire mold is adapted to mold one of: a passenger car tire, a truck tire, and an aircraft tire.

In another aspect of the invention, a tire curing press for molding and/or curing an uncured tire is provided, the tire curing press comprising a tire mold comprising tire mold segments, wherein at least one of the mold segments comprises an inner side for contacting the uncured tire, an outer side opposite to the inner side, and a plurality of venting passages for conducting gas from the inner side of the mold segment to the outer side of the mold segment, the venting passages further comprising venting slots, wherein each venting slot has an inlet at the inner side of the mold segment, the inlet having a width from 10 μm to 100 μm and wherein the venting slots taper from the inlets in a direction to the outer side of the mold segment. Furthermore, the tire curing press comprises an inflatable curing bladder for pressing an inner side of the uncured tire in an outer direction such that the outer side of the tire is pressed onto the tire mold segments.

In another aspect of the invention, a method for manufacturing a tire mold or tire mold segment, in particular in accordance with one or more of the afore mentioned aspects or embodiments, is provided, the method comprising the steps of: providing a tire mold or tire mold segment; creating venting slots on an inner side or surface of the mold or mold segment; creating channels (preferably bores) in the mold or mold segment, the channels fluidly connecting one or more outlets of one or more venting slots with the outer side or surface of the mold or mold segment.

In an embodiment, the method comprises the step of drilling one or more of said channels into the mold or mold segment.

In another embodiment, the method comprises the step of laser cutting (or engraving) the venting slots into the mold or mold segment. In general, available laser technology may be used to create the venting slots. A taper of the slots may for instance be created by adjusting the laser power during cutting/engraving or adjusting the laser optics during the cutting/engraving process. Such and other suitable processes are as such known to the person skilled in the laser cutting/engraving art.

In yet another aspect of the invention, a method for molding a tire with a tire mold is provided.

It is emphasized that one or more aspects, embodiments, or features thereof, maybe be combined with each other within the scope of the present invention.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE EMBODIMENTS

Figure 1:
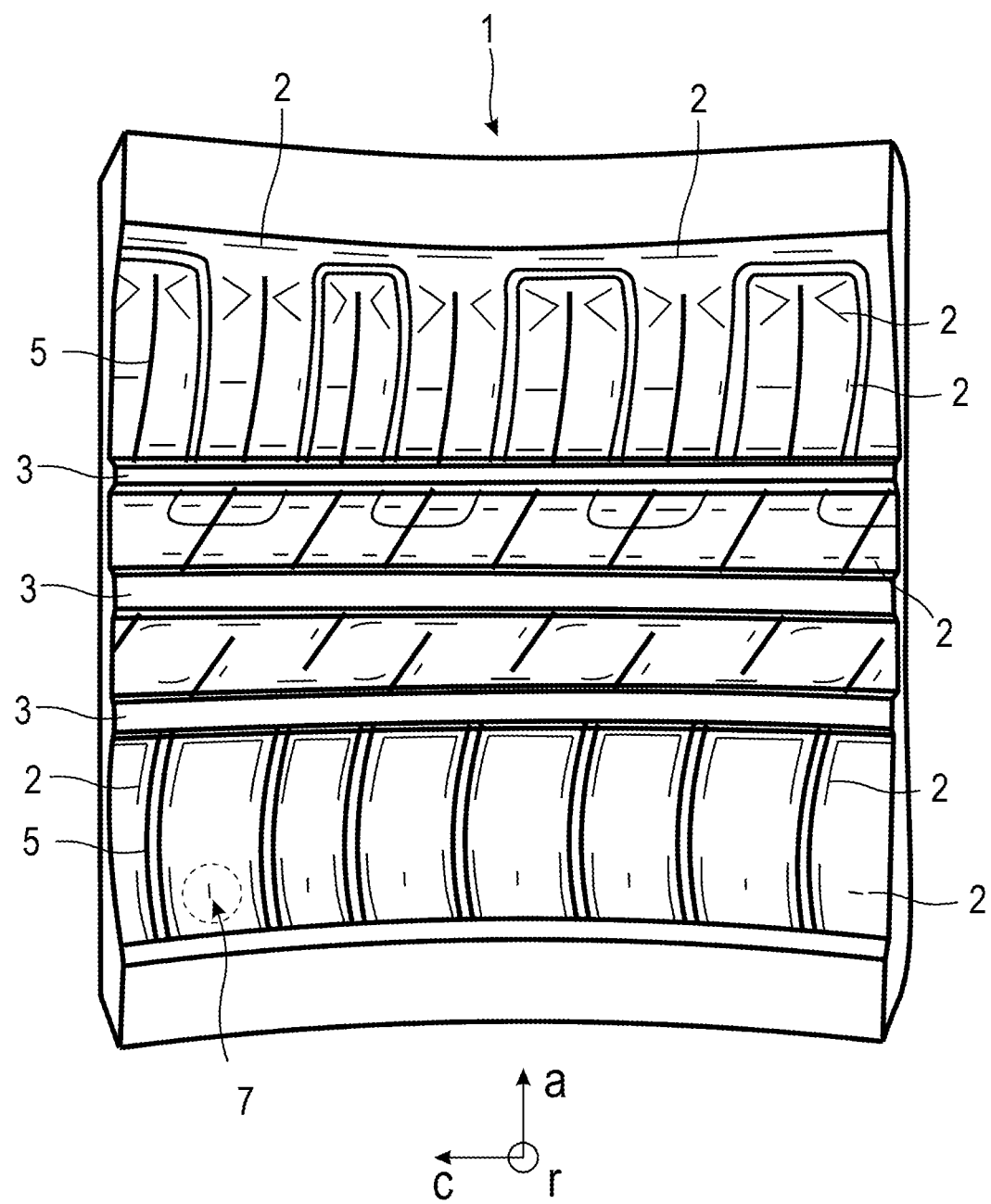
FIG. 1 shows a schematic perspective view onto the inner side of a tire mold segment in accordance with an embodiment of the present invention.

FIG. 1 shows a tire mold segment 1 in accordance with an embodiment of the present invention. The body of the mold segment 1 may be made of a metal, such as aluminum, and is intended to contact an uncured or so-called green tire in a tire curing press. The mold is intended to provide the tire, in particular its tread with the final surface pattern and/or structure. Therefore, the mold segment 1 has on its inner side a plurality of circumferential (main) ribs 3 which provide the molded tire with its main circumferential grooves. Moreover, the mold segment 1 may have a plurality of sides 5 which provide the molded tire with corresponding grooves. In general, the mold segment 1 may have a plurality of different protrusions and recesses forming corresponding recesses and protrusions in the tire.

The mold segment shown in FIG. 1 has also a plurality of venting slots 2 for venting or evacuating air through the mold or mold segment 1. An area of the depicted inner side of the mold segment 1 having one of the venting slots 2 is shown by reference numeral 7 which is further described in relation to FIGS. 2 and 3.

For the sake of easier reference, the axial direction a, the radial direction r and the circumferential direction c are indicated corresponding to the common use of these directions and terms in the tire art. Although the axial direction a and the circumferential direction care indicated with specific orientations, a reference to such directions shall not be limited to the depicted orientations.

Figure 2:
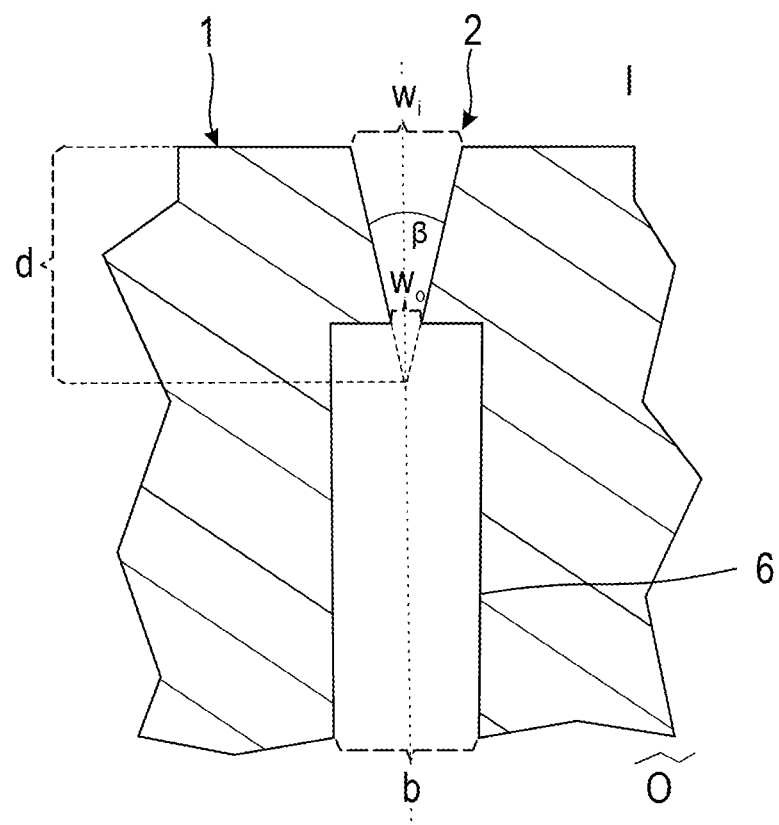
FIG. 2 shows a schematic cross-section of a part of a tire mold segment with a slot on the inner side of the mold segment, the slot being in fluid communication with a channel within the mold segment (the angles and lengths shown are exaggerated to better depict the features of the tire mold segment illustrated)

FIG. 2 shows schematically a cross-section of the area 7 shown in FIG. 2. The venting slot 2 has an inlet 4 at the inner surface of the mold segment 1. The inlet 4 has a width $W_i$ which may be measured essentially perpendicular to the length of the slot 2. Moreover, the slot 2 is tapering from the inner side of the mold I to the outer side of the mold O. The opening or tapering angle β is preferably smaller than 10° (even if the schematic drawing may exceed such a value for the sake of better illustration). The maximum depth of the venting slot 2 is indicated by reference numeral d. Such a depth d is preferably less than 5 mm, even more preferably between 1 and 3 mm. The venting slot 2 is part of a venting passage 8 which comprises also a venting channel 6 intersecting with the venting slot 2 so as to form a venting passage from the inner side I of the mold segment 1 to the outer side O of the mold segment 1. The width $W_o$ of the outlet or outer opening of the venting slot 2 into the channel 6 is smaller than the width $W_i$ of the inlet while the channel or bore 6 has a larger width or diameter b. The width $W_o$ is preferably at least 5 μm but smaller than the width $W_i$ due to the taper of the slot 2 away from the inner surface I of the mold. It is noted again that the depicted dimensions between the slot 2 and the channel 6 are shown schematically in the present drawings to illustrate the underlying principle and shall not be understood in a limiting sense.

Figure 3:
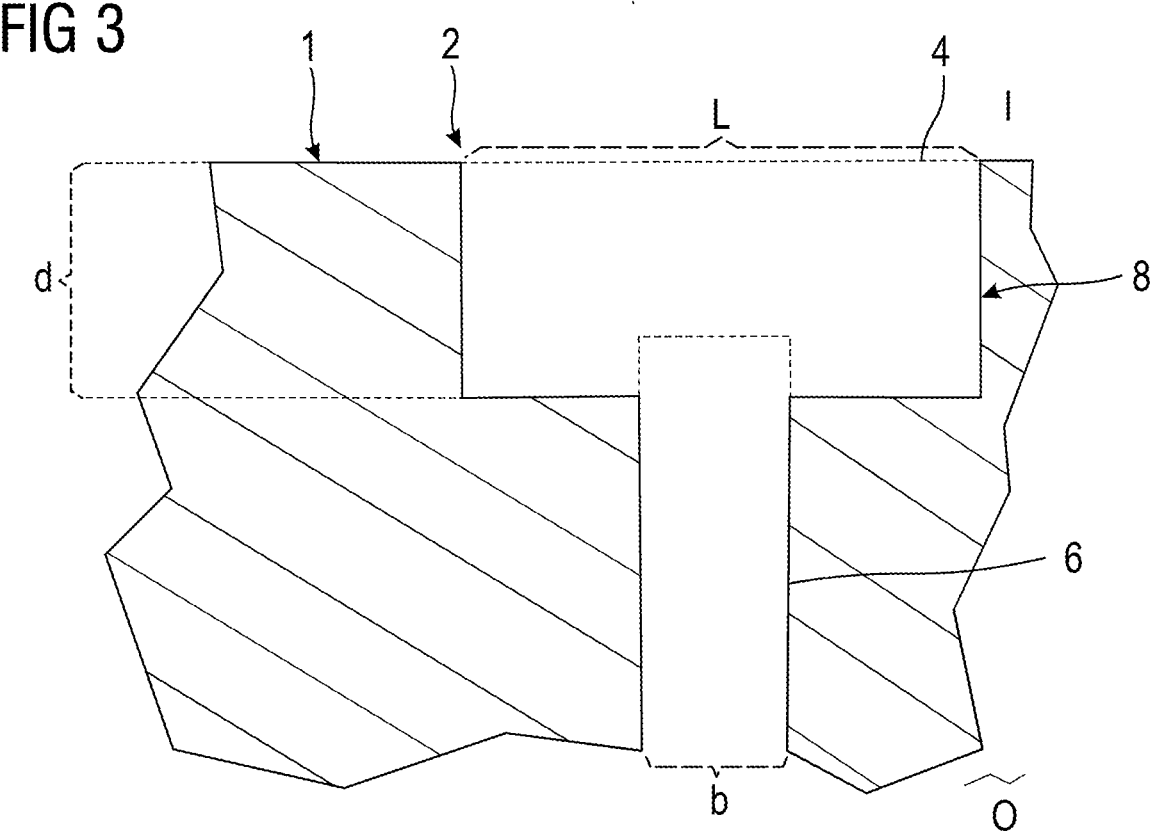
FIG. 3 shows a schematic cross-section of a mold segment, essentially perpendicular to the cross-section shown in FIG. 2.

FIG. 3 shows a schematic cross-section through the center of the venting slot 2 shown in FIG. 2 and perpendicular to the plane depicted therein. The venting slot 2 is now visible with its length L and the total depth d. Again, the length of the slot 2 may be different from the depicted length L. As visible in both FIGS. 2 and 3, the channel 6 may intersect with the venting slot 2 in an outer half of the venting slot (while it preferably does not intersect with the inner half of the venting slot).

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case, the above described embodiments and examples shall not be understood in a limiting sense. In particular, the features of the above embodiments may also be replaced or combined with one another.

The invention claimed is:

1. A tire mold segment for molding an uncured tire, the mold segment comprising: an inner side for contacting the uncured tire, an outer side opposite to the inner side, and a plurality of vent passages for conducting gas from the inner side of the mold segment to the outer side of the mold segment; wherein the vent passages include vent slots, wherein each vent slot has an inlet at the inner side of the mold segment, wherein the inlets have a width which is within the range of 10 μm to 100 μm, and wherein the widths of the vent slots taper from the inlets in a direction to the outer side of the mold segment.

2. The tire mold segment of claim 1, wherein the vent slots have a length which is within the range of 2 mm to 50 mm as measured in parallel to the inner side of the mold.

3. The tire mold segment of claim 1, wherein the inlets have a width which is within the range of 15 μm to 70 μm.

4. The tire mold segment of claim 1, wherein the vent slots have outlets opposite to the inlets, and wherein the outlets have a width of at least 5 μm.

5. The tire mold segment of claim 1, wherein the vent slots have a depth which is within the range of 0.8 mm to 5 mm.

6. The tire mold segment of claim 1, wherein the vent passages comprise at least one channel fluidly connecting one or more outlets of at least one of the vent slots with the outer side of the mold.

7. The tire mold segment of claim 6, wherein the channel has a diameter of at least 0.8 mm.

8. The tire mold segment of claim 1, wherein the vent passages comprise at least one channel fluidly connecting one or more outlets of the vent slots with the outer side of the mold by intersecting with an end region of at least one of the vent slots, said end region being located opposite to the inlet and below half of the maximum depth of the respective vent slot.

9. The tire mold segment of claim 1, wherein the vent slots are laser-cut into the mold segment.

10. The tire mold segment of claim 1, wherein a plurality of the vent slots are arranged in an essentially parallel orientation with respect to recesses in the mold for forming ribs or tread blocks on the tire.

11. The tire mold segment of claim 1, wherein a plurality of the vent slots are arranged in an essentially parallel orientation with respect to the circumferential direction of the tire.

12. The tire mold segment of claim 1, wherein a plurality of the vent slots are arranged in an essentially parallel orientation with respect to recesses in the mold for forming ribs or tread blocks on the tire, and wherein a plurality of the vent slots are arranged in an essentially parallel orientation with respect to the circumferential direction of the tire.

13. The tire mold segment of claim 1, wherein the vent slots have an opening angle β of not more than 10°.

14. The tire mold segment of claim 1, wherein the vent slots taper continuously from the inlet to an opposite end of the vent slots, and wherein wherein the vent slots have an opening angle β which is within the range of 0.5° to 8°.

15. The tire mold segment of claim 1, wherein the edges of the mold segment are free of the vent slots.

16. The tire mold segment of claim 1, wherein the mold segment comprises a plurality of protrusions on the inner side for contacting a crown area of the uncured tire and forming grooves therein.

17. A tire mold for molding an uncured tire, the tire mold comprising tire mold segments, wherein at least one of the mold segments comprises an inner side for contacting the uncured tire, an outer side opposite to the inner side, and a plurality of vent passages which allow gas to pass from the inner side of the mold segment to the outer side of the mold segment, wherein the vent passages include vent slots, wherein each vent slot has an inlet at the inner side of the mold segment, wherein the inlet have a width which is within the range of 10 μm to 100 μm, and wherein the widths of the vent slots taper from the inlets in a direction to the outer side of the mold segment.

18. The tire mold of claim 17 wherein the tire mold segments are (1) essentially ring-shaped mold segments mounted axially on top of each other or (2) ring segments connected to one another in a circumferential direction.

19. A tire curing press for molding and curing an uncured tire, the tire curing press comprising:
 a tire mold comprising tire mold segments, wherein at least one of the mold segments comprises an inner side for contacting the uncured tire, an outer side opposite to the inner side, and a plurality of vent passages for conducting gas from the inner side of the mold segment to the outer side of the mold segment, the vent passages comprising venting slots, wherein each venting slot has an inlet at the inner side of the mold segment, wherein the inlet has a width which is within the range of 10 μm to 100 μm, and wherein the widths of the venting slots taper from the inlets in a direction to the outer side of the mold segment; and
 an inflatable curing bladder for pressing an inner side of the uncured tire in an outer direction such that the outer side of the uncured tire is pressed onto the inner sides of the tire mold segments.

20. A method of manufacturing a tire comprising the step of molding and curing the tire in the tire curing press of claim 19.

* * * * *